UNITED STATES PATENT OFFICE.

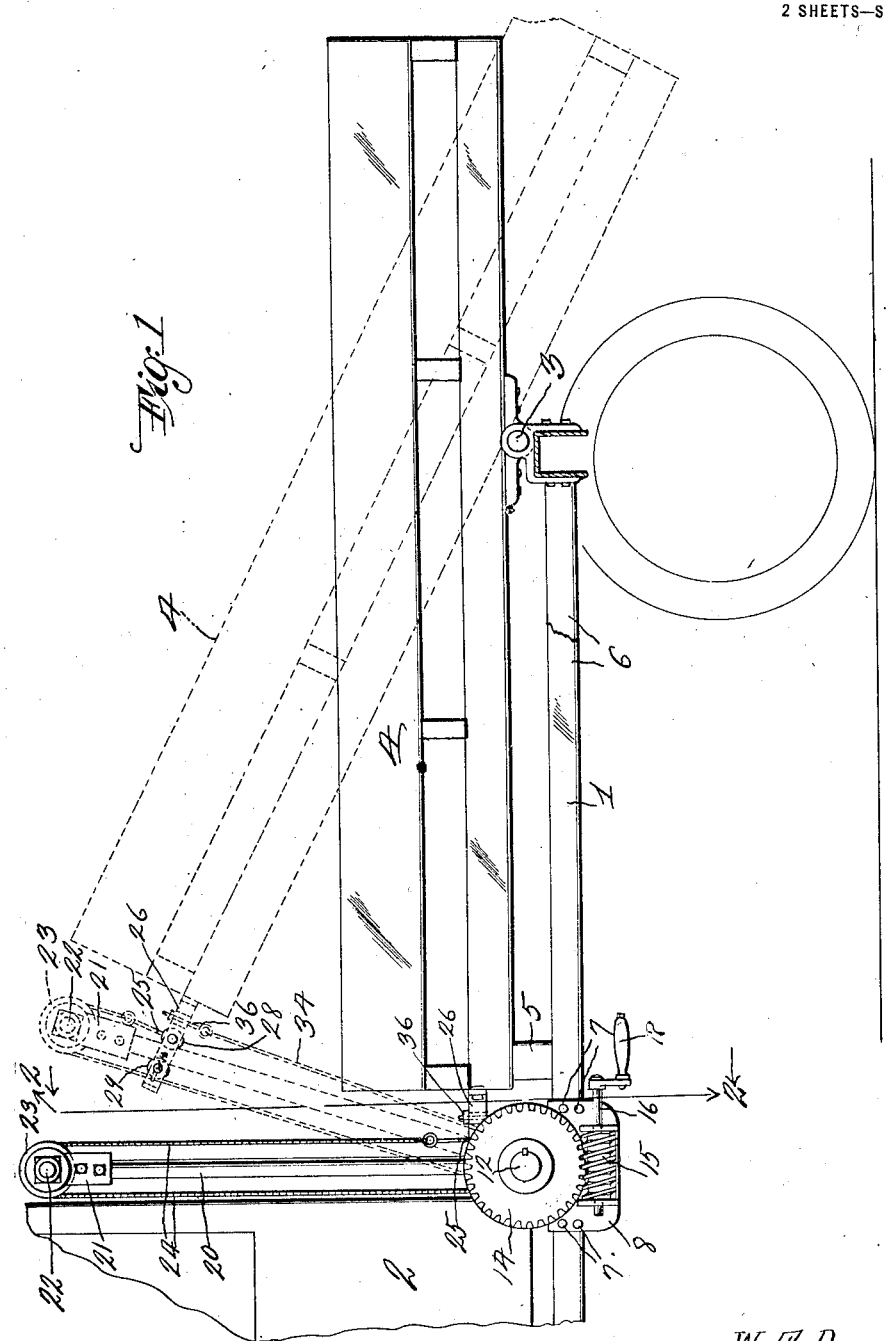

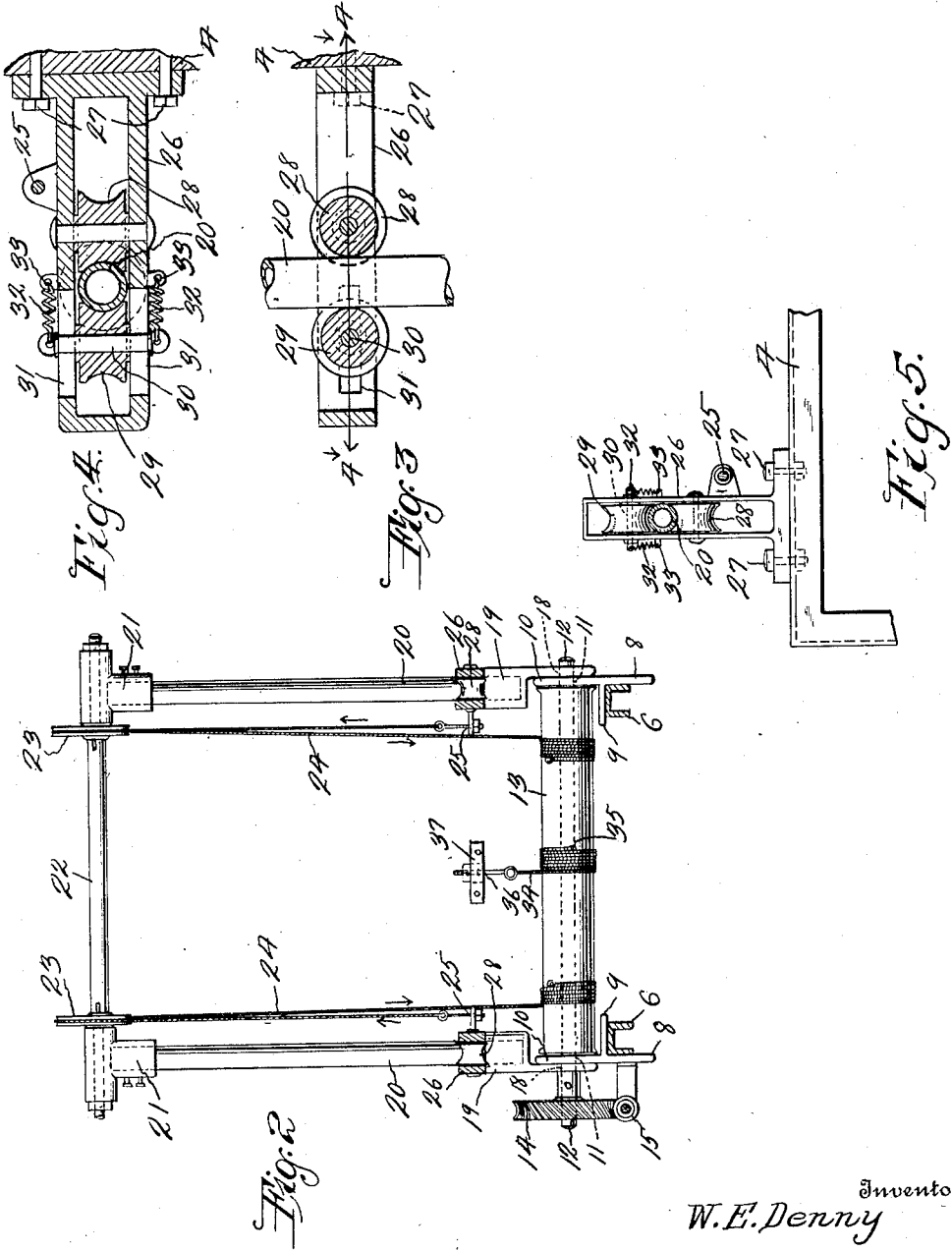

WILLIAM E. DENNY, OF LOUDONVILLE, OHIO, ASSIGNOR TO VICTOR TRACTION GEAR CO., OF LOUDONVILLE, OHIO.

HAND-OPERATED DUMP-BODY HOIST.

1,357,279.   Specification of Letters Patent.   Patented Nov. 2, 1920.

Application filed April 17, 1920. Serial No. 374,687.

*To all whom it may concern:*

Be it known that I, WILLIAM E. DENNY, a citizen of the United States, residing at Loudonville, in the county of Ashland and State of Ohio, have invented certain new and useful Improvements in Hand-Operated Dump-Body Hoists, of which the following is a specification, reference being had therein to the accompanying drawing.

The invention relates to hand operated dump body hoist for trucks and has for its object to provide a device of this character which may be easily and quickly applied to truck frames now in use without materially changing the truck structure.

A further object is to provide a pivoted frame pivoted to brackets carried by the side sills of the automobile frame, said pivoted frame having a rotatable shaft at its upper end provided with pulleys, and a rotatable drum in its lower end, around which drum and around the pulleys cables extend and have their ends connected to roller carrying brackets carried by the pivoted dump body, which roller carrying brackets receive between their rollers the uprights of the pivoted frame and guide the forward end of the tiltable dump body in its upward movement. The drum is provided with a worm gear with which a rotatable worm meshes and by means of which rotatable worm the drum is revolved during a dumping or lowering operation.

A further object is to provide cable means whereby as the forward end of the dump body is being moved downwardly said cable will pull downwardly on said forward end thereby assisting in connection with the weight of the forward end of the dump body in returning said dump body to normal position.

A further object is to provide spaced rollers carried by brackets and between which rollers the uprights of the pivoted frame are disposed, one of said rollers being held in engagement with the uprights by resilient means which causes the pivoted frame to be inclined rearwardly during a dumping operation and allows for the difference in angle of the roller carrying brackets in relation to the uprights of the pivoted frame, when the body is in dumping position.

With the above and other objects in view, the invention resides in the combination and arrangement of parts as hereinafter set forth, shown in the drawings described and claimed, it being understood that changes in the precise embodiment of the invention may be made within the scope of what is claimed without departing from the spirit of the invention.

In the drawings:—

Figure 1 is a side elevation of a conventional form of truck showing a dump body applied thereto and also the dumping mechanism.

Fig. 2 is a sectional view taken on line 2—2 of Fig. 1.

Fig. 3 is a sectional view through one of the roller carrying brackets.

Fig. 4 is a horizontal sectional view taken on line 4—4 of Fig. 3.

Fig. 5 is a plan view of one of the roller carrying brackets.

Referring to the drawings, the numeral 1 designates a frame of conventional form of motor driven truck, and 2 the cab thereof. Pivoted as at 3 to the rear end of the frame 1 is a dump body 4, the forward end of which rests on a transversely disposed sill 5 so that the body 4 is normally in a horizontal position.

Secured to the side sills 6 of the frame 1 as at 7 are brackets 8, which brackets are provided with horizontal flanges 9 which rest upon the upper faces of the sills 6 and may also be secured thereto if so desired. Brackets 8 are provided with upwardly extending flanges 10 in bearings 11 of which the pintles 12 of the drum 13 are mounted, said drum being adapted to be rotated during a dumping operation and also during the operation of returning the body to normal position. The drum 13 has one of its pintles 12 provided with a worm gear 14, with which worm gear a worm 15 meshes, worm 15 being rotatably mounted in a bearing of the bracket 8 and has its shaft 16 provided with an operating crank 17, whereby when it is desired to rotate the drum 13 during a raising and lowering operation the operating handle 17 is rotated.

Pivoted as at 18 on the pintles 12 are castings 19, in the upper ends of which upwardly extending tubular members 20 are carried. The tubular members 20 extend upwardly and have secured to their upper ends T's 21 in the horizontal arms of which a transversely disposed shaft 22 is rotatably mounted. Shaft 22 has secured thereon pulleys 23 around which pulleys, cables 24 pass from the drum and have their free ends adjustably secured as at 25 to roller carrying brackets 26, which are secured to the forward end of the dump body as at 27. It will be seen that as the drum 13 is rotated the cables 24 will be wound on the drum which will cause an upward pull on the forward end of the dump body 4 thereby causing the body to be tilted so that the contents thereof will be dumped. The hoist frame as a whole being a pivoted member, it will be seen that it will be necessary to provide guiding means so that it will be tilted to the dotted line position shown in Fig. 1. To accomplish this object the brackets 26 are provided with spaced rollers 28 and 29, which receive the tubular members 20 between their adjacent grooved faces thereby insuring the tilting of the pivoted frame. Roller 28 is a pivoted roller, however as the brackets 26 during a tilting operation assume a position at acute angles to the tubular members 20, it will be seen that one of the rollers will have to be slidably and resiliently mounted, therefore the roller 29 which is carried by the pin 30 is resiliently mounted and has its pin 30 slidably mounted in slots 31 of the brackets 26, there being springs 32 connected to the outer ends of the pins 30 and to eyes 33 on each side of the brackets 26. Thus it will be seen that the brackets on account of the resiliently mounted rollers 29, will be allowed to assume a position at an angle to the tubular members 20 other than that of a right angle.

It has been found that a great many dump bodies when being returned from their dumping positions require the provision of means for pulling downwardly on the forward end of the dump body. To accomplish this object a centrally disposed cable 34 which is wound around the drum 13, and has its end secured as at 35 to the drum is provided. The cable 34 is adjustably secured as at 36 to a bracket 37 carried by the forward end of the dump body, said cable 34 being oppositely wound in relation to the cables 24 so that it will unwind during a dumping operation and will wind during a lowering operation thereby pulling downwardly on the forward end of the dump body.

From the above it will be seen that a hand operated dump body hoist is provided which may be applied to any conventional form of truck frame and one wherein the raising and lowering operation is positive and easily accomplished by one man. It will also be seen that by providing worm and gear means for the hoist, the use of holding means is obviated and the dump body will remain anywhere it may be stopped, without the use of ratchets and pawls.

If so desired, instead of cables 24 and 34, chains may be used and when used, the pulleys may be eliminated and sprockets used in their place. However the operation would be the same.

The invention having been set forth what is claimed as new and useful is:—

The combination with a pivoted vehicle dump body, of a hand hoist for raising one end thereof, said hand hoist comprising a pivoted frame pivoted on brackets carried by the vehicle frame, said pivoted frame comprising vertical bars and a rotatable shaft rotatable in bearings of the upper ends of the bars, pulleys carried by the rotatable shaft, a rotatable drum rotatable in bearings of the brackets, guide brackets provided with resiliently mounted guide rollers and fixed guide rollers, the vertical bars being disposed between said rollers of the brackets, cables carried by the rotatable drum and passing upwardly over the pulleys and having their ends secured to the guide brackets, and hand operated worm and gear means for rotating the drum during a dumping operation.

In testimony whereof I hereunto affix my signature.

WILLIAM E. DENNY.